219-121

3/17/87 OR 4,650,956

SR

United States Patent [19]

Marhic et al.

[11] Patent Number: 4,650,956

[45] Date of Patent: Mar. 17, 1987

[54] PLASMA ARC FORMING PROCESS AND DEVICE

[75] Inventors: Gérard Marhic, Cergy; Joël Messager, Bessancourt, both of France

[73] Assignee: L'Air Liquide, Paris, France

[21] Appl. No.: 805,443

[22] Filed: Dec. 5, 1985

[30] Foreign Application Priority Data

Dec. 7, 1984 [FR] France ................................ 84 18703

[51] Int. Cl.$^4$ ................................................ B23K 9/00

[52] U.S. Cl. ........................ 219/121 PY; 219/121 PP; 219/121 PR; 219/121 PC

[58] Field of Search .................. 219/121 PC, 121 PY, 219/121 PN, 121 PQ, 121 PU, 121 PT, 74, 75, 76.16; 313/231.31, 231.41, 231.51

[56] References Cited

U.S. PATENT DOCUMENTS 3,854,032 12/1974 Cooper ........................ 219/121 PN
4,195,216 3/1980 Beauchamp et al. ........ 219/121 PO
4,577,461 3/1986 Cann ............................ 219/121 PN

FOREIGN PATENT DOCUMENTS 2534106 6/1979 France .
0036375 4/1981 Japan ............................ 219/121 PN

*Primary Examiner*—M. H. Paschall
*Attorney, Agent, or Firm*—Lee C. Robinson, Jr.

[57] ABSTRACT

For forming the plasma arc there is used nitrogen protoxide in the liquid state which is conducted through a valve (12) to an expansion orifice (33) which produces a cooling effect on the electrode (5,6). Applications in particular in plasma arc torch cutting.

14 Claims, 1 Drawing Figure

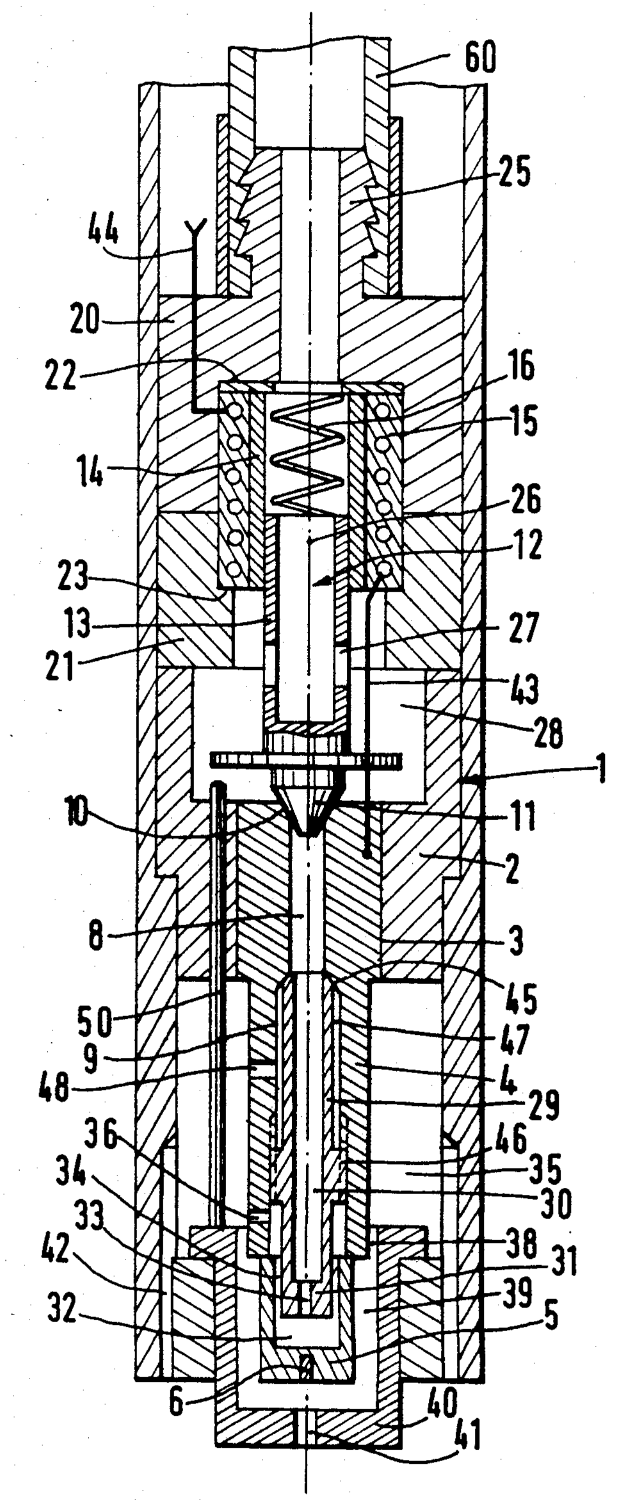
60
25
44
20
22
16
15
14
26
12
23
13
27
21
43
28
1
10
11
2
8
3
45
50
47
9
4
48
29
36
46
34
35
33
30
42
38
31
39
32
5
6
40
41

PLASMA ARC FORMING PROCESS AND DEVICE

The present invention relates to the forming of a plasma arc, of the type employing a device with an electrode and means for conducting a plasma-producing gas along and around said electrode, then through an axial restrictive conduit of a nozzle. This type of device involves either the use of a cooling liquid, which requires conduits specially provided for this purpose, or the use of the plasma-producing gas itself, but in this case it is essential to have a gas flow markedly higher than that required for forming the plasma arc proper, and, consequently, a part of the plasma-producing gas flow supplied to the device is deviated so as to allow it to escape to the free air around and at a distance from the plasma arc proper.

An object of the invention is to simplify the cooling of a plasma arc by using a special cooling gas which is also capable of forming the plasma arc.

This result is obtained in that the cooling is effected by vaporizing mainly in the region of the electrode of a gas supplied in the liquid state. According to a preferred form, the gas is nitrogen protoxide stored under pressure at abmient temperature and its vaporization occurs after expansion. There is in this way achieved with the same gas a particularly advantageous double effect, namely, on one hand, the forming of the plasma arc, since the nitrogen protoxide is constituted by elements essential to the forming of such a plasma arc, and, on the other hand, the fact that this gas is under pressure in the liquid state at ambient temperature, its mere expansion produces a powerful refrigerating effect which is quite sufficient to cool the metallic parts in the vicinity of the plasma arc and more particularly in the hottest zone of the electrode. For this purpose, it is preferably arranged that the expansion of the nitrogen protoxide occur in the immediate vicinity of the electrode.

The invention also provides a device for forming a plasma arc, in particular a cutting torch, of the type comprising a torch body including an electrode and a nozzle having a restrictive passage for forming a plasma arc, and a plasma gas supply conduit leading to said nozzle, and, according to the invention, said conduit incorporates a member having an expansion orifice for said plasma-producing gas. Preferably, the expansion orifice member is located immediately upstream of the electrode.

In an improved form of the device according to the invention, the latter includes a valve inserted in the plasma-producing gas supply conduit upstream of the expansion orifice member, and this valve is preferably remote controlled, for example it is an electromagnetic valve acting in opposition to closing return means, for example a spring or a fluid which may moreover be the plasma-producing gas.

The invention will now be described with reference to the accompanying drawing whose single FIGURE is an axial sectional view of a plasma arc forming device.

With reference to the drawing, the device comprises inside a sleeve 1, a flange 2 bored at 3 for receiving an electrode holder 4 terminating in an electrode head 5 in which is disposed a zirconium insert 6 forming the electrode proper.

The electrode holder is itself bored in such manner as to form an upstream conduit portion 8 and a downstream conduit portion 9 of larger bore.

The upstream conduit portion 8 terminates at its upstream end in an outwardly divergent frustoconical shape and is adapted to act as a seat 10 for a closure member 11 of a valve 12 whose cylindrical body 13 slides in a cylindrical housing 14 acting as a support for an electromagnetic winding or coil 15. The valve 12 is subjected to the action of a closing spring 16. The excitation winding 15 of the valve 12 is maintained in the torch body 1 by two stop members 20,21, having shoulders 22,23.

The member 20 terminates at the upstream end in a nipple 25 on which is mounted a conduit 60 for supplying nitrogen protoxide under pressure and in the liquid state.

The cylindrical body 13 of the valve 12 has a hollow portion 26 which communicates with the interior of the nipple 25 and has lateral orifices 27 through which the plasma-producing gas in the liquid state can flow into a chamber 28 located immediately downstream of the valve closure member 11.

Screwed inside the electrode conduit 9 is a member 29 provided with an axial passage 30 directly communicating at its upstream end with the conduit 8 and having at its downstream end 31, which is engaged in a cavity 32 of the electrode head 5, an expansion orifice 33 (for example a passage of 0.05 mm to 0.2 mm and preferably on the order of 0.1 mm and a length of a few millimeters) located at a short distance from the end wall of an electrode cavity or base 32, the arrangement being such that the cold gas formed on the downstream side of the expansion orifice 33 cools the electrode and escapes in the circumferential direction through an annular passage 34, provided between the member 29 and the electrode head 5, and reaches a chamber 35 located between the sleeve 1 and the electrode holder 4 through one or more lateral orifices 36. This chamber 35 communicates, on one hand, through an annular gap 38 with an annular zone 39 provided between the electrode head 5 and a nozzle 40 provided with a restrictive axial passage 41 for forming a plasma arc and, on the other hand, through one or more openings 42 communicating with the open air around the nozzle.

The electrode 6 is connected to the potential of a source of electricity through the electrode head 5, the electrode holder 4, and a conductor 43 leading to the control winding 15 of the electromagnetic valve 12, the other end of which is connected through a conductor 44 to said source of current so that the excitation winding 15 of the electromagnetic valve 12 in fact has the plasma arc current passing therethrough.

In operation, it will be observed that the nitrogen protoxide in the liquid state and under pressure is introduced through the pipe 60, the nipple 26, the interior of the electromagnetic valve 12, the chamber 28, and, if the electromagnetic valve has an arc forming current passing therethrough, i.e. if the electromagnetic valve is in the retracted position with the closure member 11 spaced away from its seat 10, the liquid nitrogen protoxide, still under pressure, enters the conduit 8 and then the cavity 30 before entering, through the expansion orifice 33, the expansion chamber 32 where it vaporizes and produces cold. Thereafter, the nitrogen protoxide in the gaseous state escapes through the annular passage 34 arranged coaxially around and outside the member 29, enters the chamber 35 through the orifices 36 and then the supply chamber 39 of the passage 41 for forming the plasma arc.

It will be observed that the expansion orifice 33 is formed at the end of a member 29 which is itself screw-threadedly mounted so as to assume a position of abutment against a shoulder 45 of the electrode holder 4, while defining between an outer wall, located upstream of the screwing zone 46, an annular space 47 therebetween and the electrode holder 4 which communicates with the chamber 35 through a passage 48. The effect of this arrangement, upon an abnormal heating which is repercussions in the region of the electrode holder 4, is to shift, by a difference in expansion, the member 29 away from its seat 45 and result in a large flow of gas directly to the chamber 35 through the passage 48 (therefore without being limited by the expansion orifice 33), and thence to the exterior through the restrictive conduit 41 and the lateral escape openings 42. This phenomenon results in a rapid gaseous purge when the nitrogen protoxide is abnormally in the gaseous state upstream of the expansion orifice, or after a prolonged stoppage of the operation of the device, or after a full cylinder has been substituted for an empty one, which reestablishes as quickly as possible the correct supply of nitrogen protoxide in the liquid state, or for assuring the rapid detection of a pressure drop resulting from the running out of the liquid phase in the nitrogen protoxide cylinder, so that it is possible to stop operation within a very short period of time.

Note also that the nozzle 40 is freely slidably mounted so as to come into a shorting contact with the electrode head 5 and ignitiate the ignition of the plasma arc. This displacement of the nozzle 40 advantageously shifts, through a sliding link 50, the valve member 11 away from its seat 10 and with the resulting apply of nitrogen protoxide.

What is claimed is:

1. A device for forming a plasma arc, in particular a cutting torch, comprising a torch body incorporating an electrode, said electrode having a front portion and a rear portion, a nozzle connected to the torch body for forming a plasma arc, and a plasma-producing gas supply conduit leading to said nozzle, said conduit having an inlet for introducing a plasma-producing gas in a liquified state into said conduit and an outlet for discharging said plasma-producing gas from said conduit, said outlet including a member defining an expansion orifice disposed just behind said rear portion of said electrode for discharging said plasma-producing gas in the immediate vicinity of said rear portion, and an expansion chamber downstream of said expansion orifice and in the immediate vicinity of said rear portion of said electrode for allowing vaporization of said plasma-producing gas after it has discharged from said expansion orifice member so that said vaporization of said gas will cool said rear portion of said electrode.

2. A device for forming a plasma arc according to claim 1, wherein the expansion orifice member is located in the immediate vicinity of the electrode and wherein said conduit has means for preventing a substantial amount of said plasma-producing gas in the liquified state from exiting said conduit except through said member defining an expansion orifice.

3. A device for forming a plasma arc according to claim 2, wherein the rear portion of said electrode has a portion in the form of a base which is open in a direction opposed to that of the nozzle and the expansion orifice member is disposed to discharge the gas exiting through said orifice member directly onto said base.

4. A device for forming a plasma arc according to claim 1, wherein the torch body incorporates a power actuated valve inserted in the plasma-producing gas supply conduit on an upstream side of the expansion orifice member.

5. A device for forming a plasma arc according to claim 4, wherein the valve is remote controlled and openable in opposition to action of a closing return element.

6. A device for forming a plasma arc according to claim 4, wherein said power actuated valve is electrically actuated.

7. A device for forming a plasma arc according to claim 5, wherein said closing return means is a spring.

8. A device for forming a plasma arc according to claim 5, wherein said closing return means is a fluid.

9. A device for forming a plasma arc according to claim 8, wherein said fluid is the liquefied gas adapted to form the plasma-producing gas.

10. A device for forming a plasma arc according to claim 6, wherein the power actuated valve includes a control winding through which passes at least a fraction of the arc current.

11. A device for forming a plasma arc according to claim 4, wherein the nozzle is axially slidably mounted, said nozzle having an extended position and a retracted position and means for mechanically engaging said valve to mechanically open said valve when said nozzle is displaced from said extended position to said retracted position.

12. A device for forming a plasma arc according to claim 1, wherein said torch body further comprises an annular electrode holder circumferentially disposed around a portion of said conduit with an annular space therebetween, said conduit having a closeable opening therein communicating with said annular space, a passage leading from said space to said nozzle, means for maintaining said opening in a closed position during normal operation and means for opening said opening during abnormal conditions of operation.

13. A device for forming a plasma arc according to claim 1, wherein the expansion orifice member comprises an expansion orifice having a diameter of 0.05 mm to 0.2 mm.

14. A device for forming a plasma arc according to claim 1, wherein the expansion orifice has a diameter on the order of 0.1 mm and a length of a few millimeters.

* * * * *